United States Patent [19]
Buizza et al.

[11] Patent Number: 5,678,496
[45] Date of Patent: Oct. 21, 1997

[54] METHOD AND PLANT FOR THE PYROLYTIC TREATMENT OF WASTE CONTAINING ORGANIC MATERIAL, PARTICULARLY FOR TREATING MUNICIPAL SOLID WASTE

[75] Inventors: Dario Buizza, Ospitaletto; Osvaldo Brioni, Solza, both of Italy

[73] Assignee: O.E.T. Calusco S.r.l., Milan, Italy

[21] Appl. No.: 588,178

[22] Filed: Jan. 18, 1996

[30] Foreign Application Priority Data

Jan. 25, 1995 [IT] Italy .................. MI95A0122
Mar. 14, 1995 [IT] Italy .................. MI95A0496

[51] Int. Cl.⁶ .................................................. F23G 5/12
[52] U.S. Cl. ..................... 110/229; 110/255; 110/346
[58] Field of Search ............................. 110/235, 255, 110/257, 349, 345, 346, 229

[56] References Cited

U.S. PATENT DOCUMENTS 4,827,855  5/1989  Koptis et al. ................. 10/345
5,495,812  3/1996  Schulze ....................... 110/237

Primary Examiner—Henry A. Bennett
Assistant Examiner—Pamela A. O'Connor
Attorney, Agent, or Firm—Guido Modiano; Albert Josif

[57] ABSTRACT

A method and a plant for the pyrolytic treatment of waste containing organic material, particularly for treating municipal solid waste. The method comprises: a step for loading the waste to be treated onto transport trolleys; a step for the insertion of the trolleys, which contain the waste, into a treatment tunnel wherein a pyrolysis chamber is formed; a step for the indirect heating of the waste inside the pyrolysis chamber up to a temperature adapted to cause waste pyrolysis, with extraction from the pyrolysis chamber of the gaseous-phase substances generated by the pyrolysis process; and a step for the extraction of the trolleys from the tunnel to unload the solid residues remained in the trolleys.

40 Claims, 4 Drawing Sheets

METHOD AND PLANT FOR THE PYROLYTIC TREATMENT OF WASTE CONTAINING ORGANIC MATERIAL, PARTICULARLY FOR TREATING MUNICIPAL SOLID WASTE

BACKGROUND OF THE INVENTION

The present invention relates to a method and plant for the pyrolytic treatment of waste containing organic material, particularly for treating municipal solid waste.

It is known that the disposal of waste, particularly of municipal solid waste, is a problem that has reached alarming proportions in recent years.

Although there are statutory provisions aimed at promoting recycling of most waste and at minimizing the environmental damage caused by disposal, the situation very often forces emergency choices that do not always allow to fully comply with these provisions.

The methods currently used for the disposal of municipal solid waste are mainly constituted by burial and incineration.

The burial method, which is currently the most widely used because of its lower cost, entails many problems, due to the difficulty in choosing the optimum location, since the selected site must comply with extremely strict hydrogeological requirements, there is a danger of water table contamination, and because it requires complicated and onerous operations for construction and reclamation.

The incineration method requires the execution of plants that are considerably more expensive, particularly as regards the devices for purifying the fumes produced by waste combustion. Although this method offers good assurances against atmospheric pollution caused by macropollutant emissions, such as for example particulates, it is less safe as regards so-called micropollutants that already constitute a high risk at low concentrations, such as for example heavy metals, chlorinated organic compounds, polycyclic hydrocarbons, and dioxins.

Alternative methods have been tested in recent years to solve the problems linked to burial and incineration methods.

One of these methods is waste pyrolysis, which consists in producing, by heating to temperatures usually around 500°600° C., the destructive distillation of the organic component of the waste by breaking down the chemical bonds of the large molecules of plastics, rubbers, vegetable organic materials, with the formation of a gaseous stream that can be used as fuel and of a solid residue containing carbon material that can also optionally be used as fuel.

The plants for the pyrolysis of municipal solid waste that have been constructed so far perform direct heating of the treated material, i.e., the waste is heated by introducing in a pyrolysis reactor both the waste and a hot gas, produced by a combustion process, that makes direct contact with the waste, raising it to the temperature required to achieve pyrolysis.

Owing to this, the gaseous product leaving the pyrolysis reactor is constituted by a mixture of gas produced by pyrolysis and of combustion gases, which entails extremely complicated subsequent treatments for removing the pollutants and for recovering the products that can be used for energy production.

Undesirable waste combustion phenomena can furthermore occur during heating, making it also more complicated to control the development of the process, since they randomly increase the temperature.

Conventional waste pyrolysis plants are furthermore complicated and expensive to provide and difficult to manage.

Owing to this, the method for treating waste by pyrolysis, despite allowing, at the theoretical level, an efficient waste disposal, with enormous advantages with respect to incineration and burial methods, has so far seen very limited diffusion.

SUMMARY OF THE INVENTION

A principal aim of the present invention is to solve the above mentioned problems by providing a method for treating waste by pyrolysis that considerably simplifies, with respect to conventional pyrolysis methods, the operations for pollutant removal and for energy recovery of the products of waste pyrolysis.

Within the scope of this aim, an object of the invention is to provide a method that can be controlled and managed in a very simple manner on the basis of parameters preset according to the type of waste being treated, with high operating flexibility.

Another object of the invention is to provide a method allowing to recover the carbon residue produced by waste pyrolysis to utilize it optionally as a combustible product even outside the treatment plant according to the invention.

Another object of the invention is to provide a plant that can perform such a treatment method in a practically continuous manner.

Another object of the invention is to provide a structurally simple plant requiring relatively low investments and operating costs.

Another object of the invention is to provide a plant offering adequate assurances against a danger of environmental pollution.

This aim, these objects, and others which will become apparent hereinafter are achieved by a method for the pyrolytic treatment of waste containing organic material, particularly for treating municipal solid waste, characterized in that it comprises: a stage for loading the waste to be treated onto transport trolleys; a stage for the insertion of said trolleys, which contain waste, into a treatment tunnel in which a pyrolysis chamber is formed; a stage for the indirect heating of waste inside said pyrolysis chamber up to a temperature adapted to cause waste pyrolysis, with extraction from said pyrolysis cheer of the gaseous-phase substances generated by the pyrolysis process; and a stage for the extraction of the trolleys from said tunnel to unload the solid residues remained in the trolleys.

In order to perform the method according to the invention, it is preferable to use a plant comprising: a treatment tunnel; means for moving, along said tunnel, trolleys for loading the waste to be treated; means for separating the inside of said tunnel from the outside environment; at least one pyrolysis chamber being formed in said tunnel, said pyrolysis chamber having means for the indirect heating of waste, introduced in said pyrolysis chamber inside said trolleys, to a temperature that is adapted to achieve waste pyrolysis; means for extracting the gaseous-phase substances produced by waste pyrolysis; and means for treating said gaseous-phase substances, extracted from said pyrolysis chamber, for the removal of pollutants.

BRIEF DESCRIPTION OF THE DRAWINGS

Further characteristics and advantages of the invention will become apparent from the following detailed description of a preferred but not exclusive embodiment of the method according to the invention and of the plant for performing it, illustrated only by way of non-limitative example in the accompanying drawings, wherein.

DESCRIPTION OF THE PREFERRED EMBODIMENTS

Figure 1:
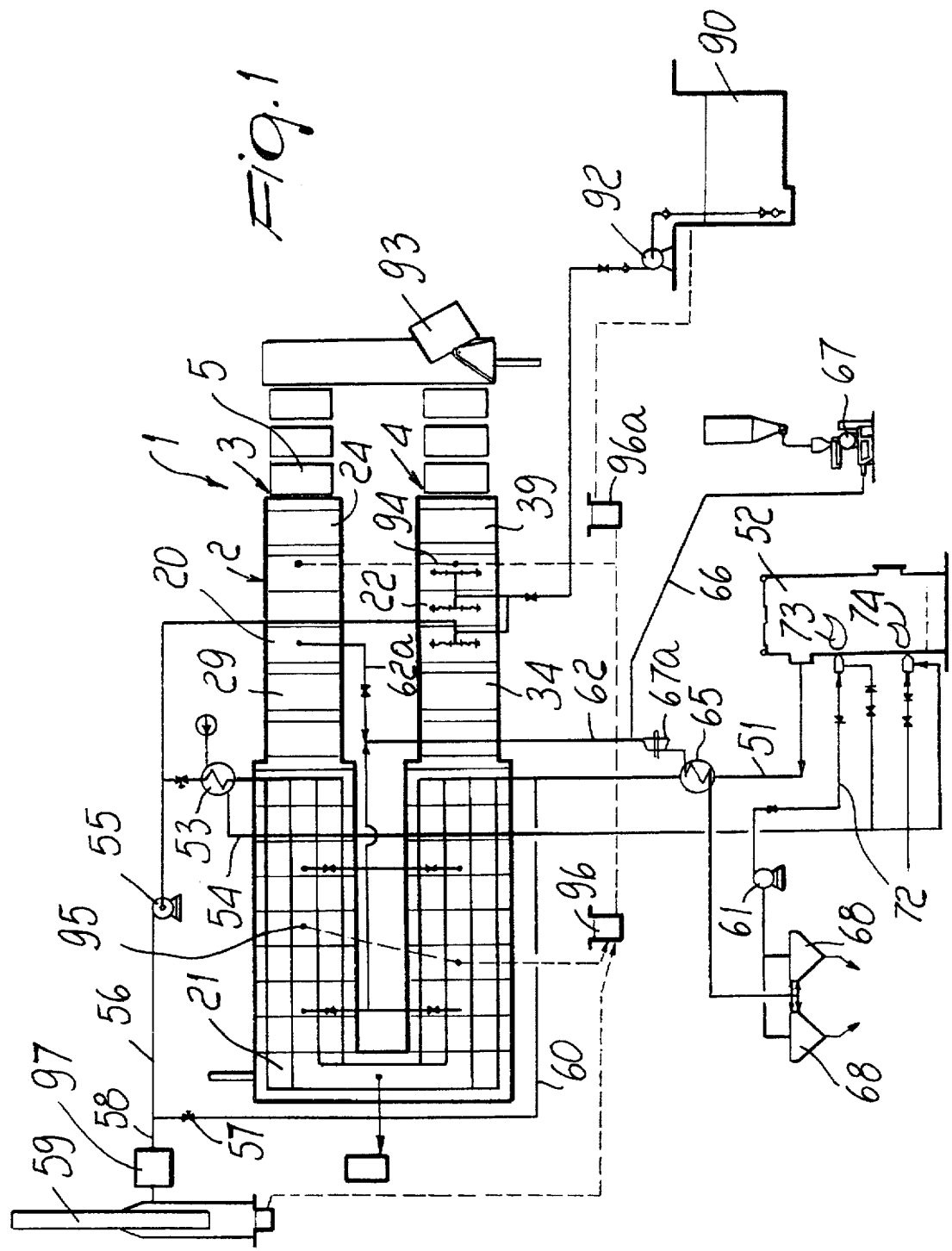
FIG. 1 is a diagram of the plant for performing the method according to the invention.

With reference to the above figures, the plant for performing the method according to the invention, generally designated by the reference numeral 1, comprises a treatment tunnel 2 lying preferably on a horizontal plane and having a substantially U-shaped arrangement, so as to have an inlet 3 and an outlet 4 arranged on a same side.

The plant comprises means for the movement of trolleys 5 along the tunnel 2; the waste to be treated is loaded into said trolleys.

The means for the movement of the trolleys 5 inside the tunnel 2 comprise rails 6, which run axially along the two arms 2a and 2b of the tunnel 2, and a beam 7a and 7b for each one of the two arms of the tunnel 2, which is slidingly accommodated in a seat 8 running along the bottom of the tunnel between the rails 6.

Each beam 7a and 7b is actuatable with a reciprocating motion, for example by means of fluid-actuated cylinders 9a and 9b actuatable on command, parallel to the longitudinal extension of the corresponding arm of the tunnel 2 wherein it is accommodated. Moreover, each beam 7a and 7b is provided with sets of locators 10a and 10b that can be extracted on command in an upward direction from the beam 7a and 7b, for example by means of fluid-actuated cylinders 11a, 11b, 12a, 12b, to be engaged or disengaged with the trolleys 5 arranged on the rails 6.

In practice, the advancement of the trolleys 5 along the tunnel 2 is performed in an intermittent fashion through the combined actuation of the fluid-actuated cylinders 9a and 9b, which cause the reciprocating motion of the beams 7a and 7b along the tunnel, and of the fluid-actuated cylinders 11a, 11b, 12a, 12b, which engage the locators 10a and 10b with the trolleys, transmitting the translatory motion of the beam to the trolleys.

A device for transferring the trolleys from the rails arranged along the arm 2a of the tunnel to the rails arranged on the arm 2b is provided along the transverse portion 2c that joins the two parallel arms of the tunnel 2; said device is constituted for example by a movable platform 13.

The movement of the movable platform 13 from one arm of the tunnel to the other can be achieved for example by means of a fluid-actuated cylinder 14 that acts on the movable platform 13, causing its reciprocating movement along a direction lying at right angles to the main dimension of the two parallel arms 2a and 2b of the tunnel 2.

A preheating chamber 20, a pyrolysis chamber 21, and a cooling chamber 22 are formed in the tunnel 2 starting from the inlet 3 and along the direction 100 in which the trolleys 5 advance along the tunnel 2; said pyrolysis chamber is divided into a first section, located in the arm 2a of the tunnel, and into a second section, located in the arm 2b of the tunnel.

A first neutral chamber 24 is preferably formed between the inlet 3 and the preheating chamber 20 and is separated from the outside environment and from the preheating chamber 20 by two vertically sliding first doors 25 and 26 that are opened and closed for example by fluid-actuated cylinders 27 and 28.

A second neutral chamber 29 is conveniently provided between the preheating chamber 20 and the pyrolysis chamber 21 and is separated from the preheating chamber 20 and from the pyrolysis chamber 21 by vertically sliding second doors 30 and 31, the opening whereof is actuated by fluid-actuated cylinders 32 and 33 like the vertically sliding doors 25 and 26.

A third neutral chamber 34 is advantageously provided between the pyrolysis chamber 21 and the cooling chamber 22 and is separated from the cooling chamber 22 and from the pyrolysis chamber by vertically sliding third doors 35 and 36 actuated by fluid-actuated cylinders 37 and 38.

Likewise, a fourth neutral chamber 39 is conveniently provided between the cooling chamber 22 and the outside environment and is separated from the outside environment and from the cooling chamber 22 by vertically sliding fourth doors 40 and 41 actuated by fluid-actuated cylinders 42 and 43.

At least two sets of locators 10a and 10b are provided on the beam 7a or 7b along each arm of the tunnel 2 and are actuatable in an independent manner so that the insertion of a trolley in the inlet 3 of the tunnel, as well as the passage of the trolley from the second neutral chamber 29 to the pyrolysis chamber 21, occurs while the doors 25 and 31 are open and the doors 26 and 30 are closed, whereas the passage of the trolley from the first neutral chamber 24 to the preheating chamber 20 and the passage of the trolley from the preheating chamber 20 to the second neutral chamber 29 are performed while the doors 26 and 30 are open, after the closure of the doors 25 and 31. The same refinement is provided on the other arm of the tunnel, so that the pyrolysis chamber 21 can never be directly connected to the adjacent environment. Through this refinement, combined with the presence of the neutral chambers 24, 29, 34, and 39, the emission of pollutants into the outside environment is practically reduced to zero.

Figure 2:
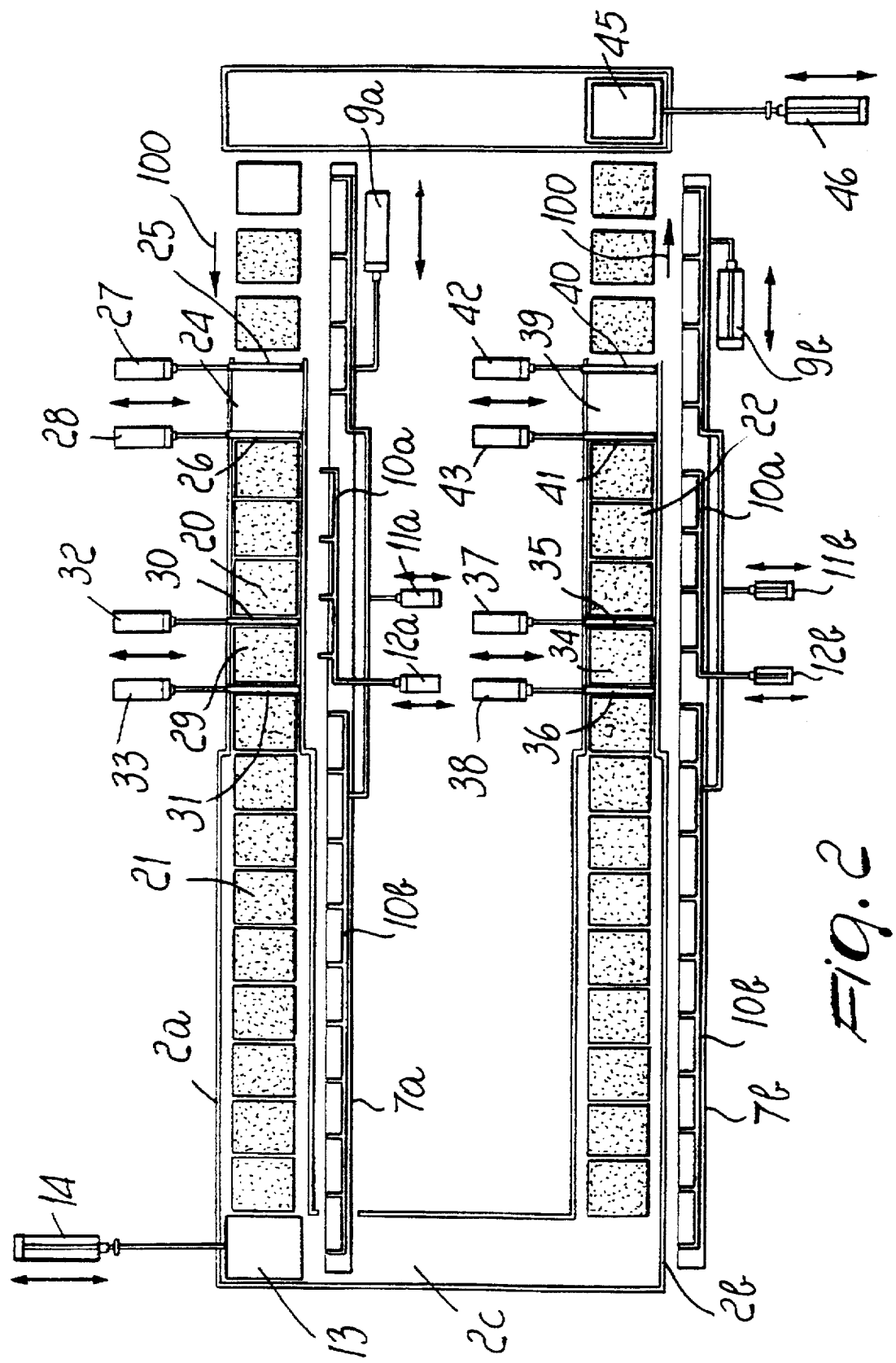
FIG. 2 is a schematic view of the means for moving the waste loading trolleys along the treatment tunnel.
Figure 3:
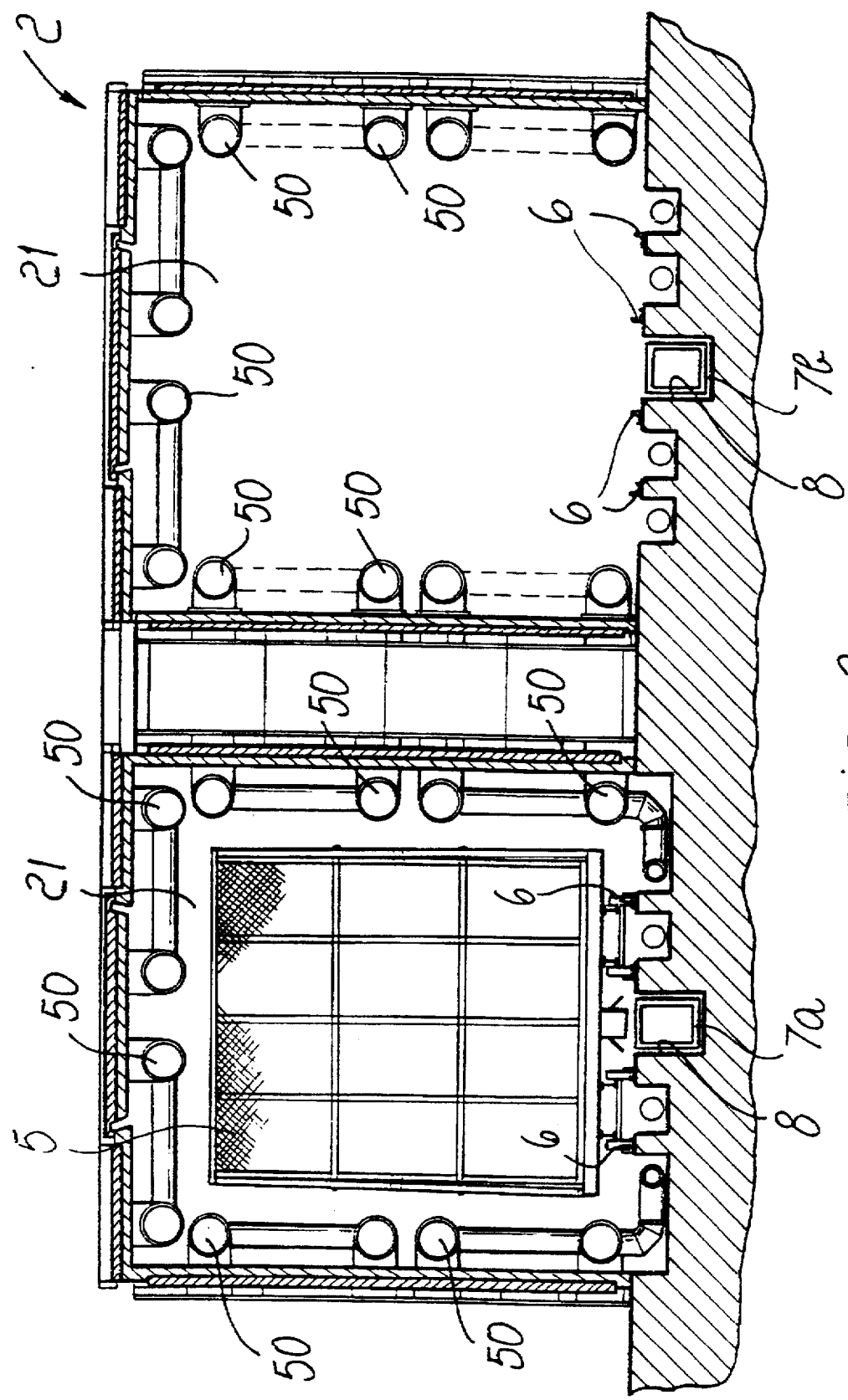
FIG. 3 is a schematic sectional view of the pyrolysis chamber, taken along a vertical plane.
Figure 4:
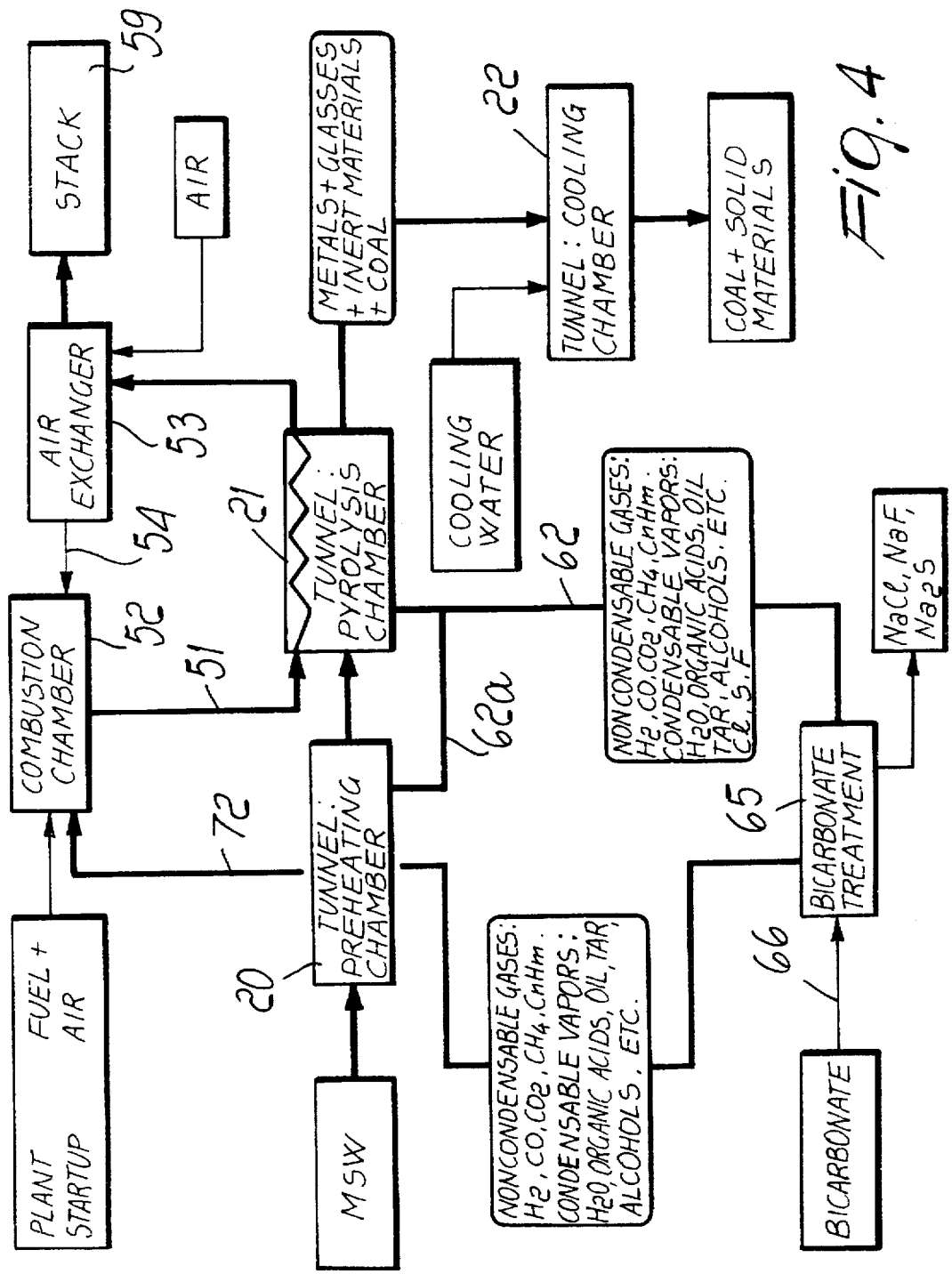
FIG. 4 is a flowchart of the method according to the invention.

For the sake of greater clarity, the doors that separate the various chambers formed in the tunnel 2, as well as the beams 7a and 7b with the corresponding locators 10a and 10b, have been shown on a plane rotated through 90° with respect to the actual plane of arrangement corresponding to the tunnel in FIG. 2. Furtherore, the beams 7a and 7b, as well as the locators 10a and 10b and the corresponding actuation elements, have been shown laterally adjacent to the two arms 2a and 2b of the tunnel shown in plan view.

Proximate to the inlet 3 and to the outlet 4 of the tunnel a device for transferring the trolleys 5 from the outlet towards the inlet is provided. Said transfer device is constituted for example by a movable platform 45 actuated by a fluid-actuated cylinder 46.

The entire system for the movement of the trolleys and the doors is controlled by a control and monitoring element, for example a PLC, that supervises the movement of said elements according to a programmed sequence.

According to the invention, the plant is provided, inside the pyrolysis chamber 21, with means for the indirect heating of the waste introduced in the pyrolysis chamber 21 and contained in the trolleys 5. Said indirect heating means are constituted by radiating bodies 50, such as for example batteries of tubular bodies, which are supplied, through a duct 51, with the fumes of a combustion chamber 52.

The outlet of the radiating bodies 50 is connected to an exchanger 53, in which the gases, i.e., the fumes exiting from the radiating bodies, are used additionally as a heating fluid to preheat the combustion air, which is conveyed to the combustion chamber 52 through a duct 54.

The fumes arriving from the combustion chamber 52 are circulated inside the radiating bodies 50 by means of an aspirator device 55 whose intake duct is connected at the outlet of the exchanger 53; said aspirator device, through a duct 56, conveys the exhaust gases or fumes to a discharge duct 58 connected to a cyclone stack 59 and to an adjustment valve 57. Said adjustment valve 57 has an outlet duct 60 connected to the duct 51 arriving from the combustion chamber 52. The valve 57 is adjustable so as to increase or decrease the flow-rate of the fumes (which, by way of approximation, have a temperature of around 200°–450° C.) conveyed along the duct 60, i.e., recirculated, in addition to the fumes originating directly from the combustion chamber 52 (which, by way of approximation, have a temperature of around 900°–1300° C.), so as to allow temperature adjustment of the fumes introduced in the radiating bodies 50 and thus allowing temperature adjustment inside the pyrolysis chamber 21.

The plant comprises means for extracting the gaseous-phase substances produced by pyrolysis inside the chamber 21 and means for treating said gaseous-phase substances to remove the pollutants that they contain.

The extraction means comprise an aspirator 61 the intake duct whereof is connected to an extraction duct 62 provided with a plurality of branches connected to the inside of the pyrolysis chamber 21.

The extraction duct 62 furthermore has a branch 62a connected to the preheating chamber 20.

The treatment means are advantageously constituted by heat treatment means, i.e., means that allow to provide a treatment at a temperature that avoids even partial condensation of the vapors contained in the stream leaving the pyrolysis chamber 21. Said heat treatment means comprise a tubular treatment reactor 65 connected to the extraction duct 62 and in which a substance adapted to remove the pollutants contained in the gaseous phase produced by pyrolysis is introduced through a duct 66. Said substance is preferably constituted by sodium bicarbonate supplied by a feeder 67a, for example a turbine or a dosage screw feeder, after it has been prepared in the appropriate size in a micronizing mill 67.

The reactor 65 is kept hot by indirect heat exchange with the combustion gases arriving from the combustion chamber 52 and is sized so as to ensure a contact time between the reagent and the gaseous-phase substances produced by pyrolysis substantially longer than 1.5 seconds and ensures substantially complete removal of the pollutants present in the gaseous-phase substances produced by pyrolysis.

The reactor 65 is connected in output to a hot filtration device 68, whereby the excess reagent and salts formed by the reaction for neutralizing the pollutants are retained.

The filtration device 68 is appropriately thermally insulated to minimize heat losses.

The purified gaseous-phase substances, which are rich in combustible substances, are fed through a duct 72 to a burner 73 located in the combustion chamber 52.

The combustion chamber 52 is sized so as to ensure retention times of over 2 seconds and a temperature higher than 950° C., as prescribed by statutory provisions for environmental protection.

Inside the combustion chamber 52 a starter burner 74, supplied for example with methane gas, is also provided.

The fumes leaving the combustion chamber 52 are then conveyed, as mentioned, through the duct 51 to the radiating bodies 50 arranged in the pyrolysis chamber 21.

For the sake of completeness in description, it should be noted that proximate to the outlet 4 it is possible to provide a tipping device 93 for the trolleys 5, to facilitate the unloading of the solid-phase residues produced by the waste treatment performed inside the tunnel 2.

It is furthermore possible to provide, along the extension of the tunnel, traps and pipes for optionally collecting water and condensates; said traps and pipes are designated by the reference numerals 94 and 95 and are connected to wells 96 and 96a. It is also possible to provide, again along the longitudinal extension of the tunnel 2, water spraying devices acting as fire safety.

A filter 97 is conveniently provided along the duct 58, directly upstream of the stack 59, and is for example a bag filter of a known type that retains low-boiling heavy metals, such as for example cadmium and mercury, and any particulate, so as to avoid their emission into the atmosphere.

The removal of the heavy metals can be facilitated by introducing, upstream of the filter 97, nucleating and/or adsorbent agents (sodium bicarbonate, activated charcoal fines).

For safety reasons, the tunnel is furthermore provided with explosion-proof doors.

The operation of the plant in the execution of the method according to the invention is as follows.

The trolleys 5, loaded with the waste to be treated, for example municipal solid waste (MSW), are inserted in the tunnel 2 and moved forward intermittently along the longitudinal extension of the tunnel 2.

During advancement inside the tunnel, the trolleys 5 pass initially into the first neutral chamber 24 and then, in the manner provided to minimize connection of the inside of the tunnel to the outside, into the preheating chamber 20. The proximity of the pyrolysis chamber 21 to the preheating chamber 20 ensures, inside said preheating chamber 20, a temperature which, depending on the temperature maintained in the pyrolysis chamber 21, can vary substantially between 40° C. and 80° C. At this temperature, the waste begins to dry out, forming gas constituted by vapor and optionally small amounts of pyroligneous gas. The vapor and any pyroligneous gas are removed from the preheating chamber 20 through the duct 62a.

The drying of the waste and the formation of vapor and pyroligneous gas continue in the second neutral chamber 29, which as a consequence of its even greater proximity to the pyrolysis chamber 21 has a temperature substantially between 60° C. and 100° C.; the vapor and the pyroligneous gas are extracted indirectly from the second neutral chamber 29 when it is connected to the preheating chamber 20 or to the pyrolysis chamber 21.

In the pyrolysis chamber 21, the temperature, as a consequence of the indirect heating produced by the radiating bodies 50, is substantially between 200° C. and 650° C., depending on the type of waste to be processed, and preferably 500° C. in the case of municipal solid waste.

Waste pyrolysis, i.e., the thermochemical breakdown of the organic matter contained in said waste, occurs at this temperature. The products of this thermochemical reaction, which occurs practically in the absence of air, are constituted by solid-phase residues, which remain in the trolleys 5, and by gaseous-phase substances, which are removed from the pyrolysis chamber 21 through the duct 62.

The gaseous phase is in turn formed by a condensable component and by a noncondensable component.

The condensable component essentially contains water, tars, pitches, aliphatic and aromatic hydrocarbons, organic acids, and alcohols, whereas the noncondensable component is substantially composed of hydrogen, light hydrocarbons, carbon monoxide and carbon dioxide. The gaseous-phase substances also contain pollutants, such as chlorine and sulphur, and possibly fluorine in small amounts.

The gaseous-phase substances are then sent to the reactor 65, where the pollutants are removed by heating, forming salts of NaCl, NaF, and $Na_2S$ that are then retained by the filtration device 68 together with the excess reagent.

The gaseous-phase substances thus purified, which thanks to the heat treatment still have a temperature over 300° C., i.e., above the condensation point of even the high-boiling substances of its condensable component, are then sent to the burner 73 in the combustion cheer 52 and used as fuel to produce the fumes supplying the radiating bodies 50 arranged in the pyrolysis chamber 21, producing the self-support of the pyrolysis reaction.

The trolleys with the solid-phase residues produced by waste pyrolysis, after passing through the third neutral chamber 34, reach the cooling chamber 22. In said cooling chamber 22, the trolleys containing the solid phase, i.e., the residual solid products produced by waste pyrolysis, are cooled to a temperature substantially lower than 150° C., preferably lower than 100° C. Cooling is preferably performed by spraying atomized water over the trolleys or by using a tube-nest heat exchanger inside which water flows, said exchanger being located in the cooling chamber 22, or with both systems combined. Obviously, the necessary equipment will be in accordance with the type of cooling selected.

For example, the cooling water can be supplied by a pump 92 drawing from a water collection tank 90 connected to the wells 96 and 96a and collecting rainwater and any replenishment water as well.

In this manner, the temperature of said residual solid products, at the exit from the cooling chamber 22, is such as to exclude, with absolute safety, the possibility of spontaneous ignition when they are introduced into the outside environment. The trolleys are then conveyed into the fourth neutral chamber 39 and then extracted from the tunnel.

The solid products remained inside the trolleys, constituted by carbon material mixed with metals, glasses, and other inert materials, are then conveyed to facilities for the separation of the metallic components and of the inert materials from the carbon component, which can optionally be conveyed to the combustion chamber 52 or to another combustion chamber possibly provided with a grate in order to use the carbon as fuel, or meant for other uses, for example for the treatment of waste water, as activated charcoal.

In practice, the method can be self-sustained in terms of energy by using the heat energy supplied by the combustion of the gaseous-phase substances produced by pyrolysis, optionally complemented by the combustion of the carbon obtained by the separation of the solid-phase residues from the metals and from the inert materials.

The retention time of each trolley inside the tunnel 2 varies according to the characteristics of the waste to be treated (type, composition, average size and moisture level). In practice, although the advancement of the trolleys inside the tunnel 2 occurs intermittently, the process is substantially continuous.

In practice it has been observed that the process, as well as the plant for performing it, fully achieve the intended aim, since they greatly simplify, with respect to conventional pyrolysis methods, the operations for removing pollutants and for using the gaseous-phase substances produced by the pyrolysis process, which have the purpose of using said substances to produce heat energy.

Another advantage of the invention is the possibility to set the entry temperature of the hot fumes in the radiating bodies, which allows to control the temperature of the pyrolysis chamber.

The movement of the trolleys can furthermore be completely automated by setting the desired times, accordingly varying the retention time inside the treatment tunnel.

In this manner, the two main process variables (time and temperature) can be adjusted separately, achieving considerable operating flexibility. This allows to treat waste having different chemical and physical characteristics, optimizing the result.

Another advantage of the plant for performing the process according to the invention is that it uses, for the pyrolysis process, a tunnel that can be produced with elements that can be prefabricated in a workshop and can be easily assembled on site, reducing transportation and construction difficulties; moreover, the horizontal configuration eliminates the problems linked to feeding from above, which can be observed in conventional pyrolysis reactors, thus simplifying maintenance actions.

Another advantage of the plant for performing the method according to the invention is that it can accept a wide range of waste sizes, eliminating the need for any pretreatment of the waste, and that it facilitates, after the pyrolysis treatment, the recovery of sterilized inorganic components (metals).

The method according to the invention is basically different both from common waste incineration processes and from conventional pyrolysis processes.

With respect to incineration processes, it is in fact advantageous owing to a very easily controllable combustion of the volatile waste fraction only (which is distilled at a temperature of approximately 500° C.); this ensures, in practice, the absence of unburnt components and of fly ash in the combustion products and in the gaseous emissions of the plant.

With respect to conventional pyrolysis plants, there are enormous advantages as regards fume treatment. With the process according to the invention, no treatment is in fact required, since the treatment for removing pollutants is performed on the fuel, i.e., on the gaseous-phase substances produced by pyrolysis, and is a treatment limited to a stream having a very small mass and therefore performable very efficiently and at low costs. It should also be noted that this treatment, in the process according to the invention, is performed at temperatures slightly higher than the operating temperatures of the pyrolysis chamber: this avoids condensation of high-boiling components and favorably shifts the conditions of the gaseous phase with respect to the Boudouard equilibrium and the water vapor equilibrium.

Furthermore, the rather low temperature at which pyrolysis is performed in the method according to the invention minimizes any material corrosion problems and also tends to produce thermal cracking products having a substantially aliphatic nature. Low contents of aromatic, polycyclic, or heterocyclic hydrocarbons with varying degrees of substitution constitute an assurance factor with respect to presence, in any point of the plant, of feared chlorinated organic compounds, the formation whereof is also made unlikely by the very low chlorine content in the gaseous-phase substances (chlorine is not detectable in the elementary analysis of said gaseous phase after the treatment for removing pollutants), as well as by the absence of fly ash, which is universally considered as a necessary catalyst for the formation of PCDD (polychlorinated dibenzoparadioxins) and PCDF (polychlorinated dibenzofurans).

As regards the energy aspects, first of all it should be noted that from an absolutely general point of view no process for the thermal disposal of waste can be a form of power generation process.

Rather, in conventional methods it is technically necessary to dispose, even with low efficiency, of the energy obtained as an unwanted by product of the primary goal.

From this viewpoint, too, the method according to the invention is again in a more favorable condition, since it is a substantially autothermal process that returns the excess energy content of waste in the form not of thermal but chemical energy, i.e., energy accumulated in the carbon residue of pyrolysis. This energy can be stored and transported and is rather flexible in use.

The method and the plant for performing it, thus conceived, are susceptible of numerous modifications and variations, all of which are within the scope of the inventive concept; all the details may furthermore be replaced with other technically equivalent ones.

In practice, the materials employed, as well as the dimensions, may be any according to the requirements and the state of the art.

What is claimed is:

1. A method for the pyrolytic treatment of waste containing organic material, particularly for treating municipal solid waste, said method comprising: a step for loading the waste to be treated onto transport trolleys; a step for insertion of said trolleys, which contain the waste, into a treatment tunnel in which a pyrolysis chamber is formed; a step for indirect heating of the waste inside said pyrolysis chamber up to a temperature adapted to cause waste pyrolysis, with extraction from said pyrolysis chamber of gaseous-phase substances generated by the pyrolysis; and a step for extraction of the trolleys from said tunnel to unload solid residues remained in the trolleys.

2. Method according to claim 1, further comprising a step for treatment of said gaseous-phase substances extracted from the pyrolysis chamber to eliminate pollutants.

3. Method according to claim 2, wherein heating of the waste, in said heating step, is performed through radiating bodies arranged in said pyrolysis chamber.

4. Method according to claim 3, wherein said treatment step comprises a heat treatment of said gaseous-phase substances with sodium bicarbonate, followed by filtration of the produced salts and of the excess reagent.

5. Method according to claim 3, wherein the gaseous substances emitted by the waste in said preheating chamber are combined with said gaseous-phase substances generated by the pyrolysis when they exit from said pyrolysis chamber.

6. Method according to claim 4, wherein said heat treatment to remove the pollutants is performed at a temperature above 300° C.

7. Method according to claim 4, wherein said gaseous substances, after the treatment for removing the pollutants, are sent to at least one combustion chamber and used as fuel.

8. Method according to claim 7, wherein fumes leaving said combustion chamber are fed to said radiating bodies arranged in said pyrolysis chamber.

9. Method according to claim 8, wherein said fumes fed to said radiating bodies are used, when leaving said radiating bodies, to preheat combustion air being supplied to said combustion chamber.

10. Method according to claim 9, wherein fumes exiting from said radiating bodies are partially recirculated in said radiating bodies in addition to fumes arriving directly from said combustion chamber to adjust the temperature of fumes introduced in said radiating bodies.

11. Method according to claim 10, wherein the fumes that exit from said radiating bodies are subjected to filtration to remove low-boiling heavy metals and/or particulate.

12. Method according to claim 1, wherein before said heating step, a step is provided for indirect preheating of waste in a preheating chamber, said preheating chamber being arranged in said tunnel upstream of said pyrolysis chamber along a direction of advancement of the trolleys in said tunnel.

13. Method according to claim 11, wherein, in said preheating step, waste is heated to a temperature being substantially between 40° C. and 80° C.

14. Method according to claim 11, wherein gaseous substances released by waste in said preheating step are extracted from said preheating chamber.

15. Method according to claim 11, wherein during said heating step the waste is heated to a temperature being substantially between 250° C. and 650° C.

16. Method according to claim 11, wherein during said heating step the waste is heated to a temperature of substantially 500° C.

17. Method according to claim 11, wherein, after said heating step and before said extraction step, the solid-phase residues produced by waste pyrolysis are subjected to a cooling step in a cooling chamber, said cooling chamber being located in said tunnel downstream of said pyrolysis chamber along the direction of the advancement of the trolleys in said tunnel.

18. Method according to claim 17, wherein during said cooling step said solid-phase residues are brought to a temperature lower than 150° C.

19. Method according to claim 17, wherein during said cooling step said solid-phase residues are brought to a temperature being lower than 100° C.

20. A plant for treating waste containing organic material, particularly for treating municipal solid waste, said plant comprising: a treatment tunnel defining an inside treatment zone; means for moving trolleys for loading the waste to be treated along an advancement direction along said tunnel; means for separating said inside zone of said tunnel from outside environment; at least one pyrolysis chamber being formed in said tunnel, said pyrolysis chamber being provided with heating means for indirect heating of waste introduced in the pyrolysis chamber on said trolleys at a temperature adapted to achieve waste pyrolysis; means for extracting from said pyrolysis chamber gaseous-phase substances produced by waste pyrolysis; and treatment means for treating said gaseous-phase substances extracted from said pyrolysis chamber to remove pollutants.

21. Plant according to claim 20, wherein said treatment means comprise means for heat treatment of said gaseous-phase substances extracted from the pyrolysis chamber for removal of pollutants.

22. Plant according to claim 21, wherein said means for extracting the gaseous-phase substances generated by the pyrolysis comprises an aspirator, said aspirator being connected to said pyrolysis chamber through an extraction duct.

23. Plant according to claim 22, wherein said extraction duct is connected to an inlet of said means for the heat treatment of the gaseous-phase substances produced by pyrolysis, said heat treatment means comprising a reactor, said reactor being supplied with a reagent, and a device for filtering salts produced and excess reagent.

24. Plant according to claim 22, wherein said extraction duct for extracting the gaseous-phase substances generated by the pyrolysis has a branch, said branch being connected to said preheating chamber.

25. Plant according to claim 23, comprising a mill for grinding solid-phase reagent, said solid reagent being supplied to said reactor.

26. Plant according to claim 20, wherein said tunnel lies on a substantially horizontal plane and is substantially U-shaped, with an inlet and an outlet thereof.

27. Plant according to claim 20, wherein in said tunnel, upstream of said pyrolysis chamber, along the direction of the advancement of said trolleys along said tunnel, there is provided a preheating chamber, said preheating chamber being separated from said pyrolysis chamber and from the outside environment by at least one door, said door being movable on command to allow the trolleys to pass.

28. Plant according to claim 27, wherein in said tunnel, downstream of said pyrolysis chamber along the direction of the advancement of said trolleys along said tunnel, there is provided a cooling chamber for cooling solid-phase residues produced by the waste pyrolysis.

29. Plant according to claim 27, wherein a first neutral chamber is provided between said preheating chamber and the outside environment and said first neutral chamber being separated from the outside environment and from said preheating chamber by first doors, said first doors being movable on command to allow said trolleys to pass.

30. Plant according to claim 29, wherein a second neutral chamber is formed between said preheating chamber and said pyrolysis chamber, said second neutral chamber being delimited by second doors, said second doors being movable on command to allow said trolleys to pass.

31. Plant according to claim 30, wherein a third neutral chamber is formed between said pyrolysis chamber and said cooling chamber, said third neutral chamber being delimited by third doors, said third doors being movable on command to allow said trolleys to pass.

32. Plant according to claim 31, wherein a fourth neutral chamber is provided between said cooling chamber and the outside environment and said fourth neutral chamber being separated from the outside environment and from said cooling chamber by fourth doors, said fourth doors being movable on command to allow said trolleys to pass.

33. Plant according to claim 20, further comprising a combustion chamber, said indirect heating means comprising batteries of radiating bodies having a tubular structure, said heating means being arranged in said pyrolysis chamber, and being connected to a fume outlet of said combustion chamber.

34. Plant according to claim 33, comprising a duct for feeding a burner of said combustion chamber, said heat treatment means being connected in output to said duct for feeding said burner with said gaseous-phase substances, wherefrom the pollutants have been removed.

35. Plant according to claim 33, wherein said combustion chamber is provided with a starter burner.

36. Plant according to claim 33, wherein said at least one combustion chamber is provided with a coal-fired burner.

37. Plant according to claim 33, comprising a heat exchanger for heating combustion air conveyed to said combustion chamber, said heat exchanger being connected to an outlet of said radiating bodies to utilize fumes exiting from said radiating bodies as a heating fluid.

38. Plant according to claim 37, comprising a recirculation valve for the recirculation of the fumes exiting from said radiating bodies, an inlet of said valve being connected to an outlet duct of said exchanger for heating the combustion air, and an outlet of said valve being connected to a fume outlet duct of said combustion chamber, said fume outlet duct feeding said radiating bodies, said recirculation valve being adjustable to vary temperature of the fumes fed to said radiating bodies.

39. Plant according to claim 38, wherein the outlet duct that leads into the inlet of said recirculation valve is connected to a discharge duct, said discharge duct being connected to a stack, and a filter being provided along said discharge duct to retain low-boiling heavy metals and particulate.

40. Plant according to claim 20, wherein said means for moving said trolleys comprise: a rail, said rail running along said tunnel; and means for intermittent advancement of said trolleys along said tunnel on said rail.

* * * * *